(12) United States Patent
Takahashi et al.

(10) Patent No.: US 7,707,816 B2
(45) Date of Patent: May 4, 2010

(54) GAS TURBINE SYSTEM BURNING HEAVY-OIL MODIFIED FUEL AND METHOD OF OPERATING SAME

(75) Inventors: Hirokazu Takahashi, Hitachinaka (JP); Shinichi Inage, Hitachi (JP); Kouji Nishida, Hitachiohta (JP); Nobuyuki Hokari, Hitachinaka (JP); Osami Yokota, Hitachinaka (JP); Akinori Hayashi, Hitachinaka (JP); Shinsuke Kokubo, Hitachinaka (JP)

(73) Assignees: Hitachi, Ltd., Tokyo (JP); Petroleum Energy Center, Tokyo (JP)

( * ) Notice: Subject to any disclaimer, the term of this patent is extended or adjusted under 35 U.S.C. 154(b) by 1058 days.

(21) Appl. No.: 11/359,379

(22) Filed: Feb. 23, 2006

(65) Prior Publication Data
US 2006/0185368 A1   Aug. 24, 2006

(30) Foreign Application Priority Data
Feb. 24, 2005   (JP) .............................. 2005-048424

(51) Int. Cl.
*F02B 43/00* (2006.01)
(52) U.S. Cl. .................. 60/39.461; 60/39.12; 60/39.463
(58) Field of Classification Search .................... 60/780, 60/772, 39.12, 39.461, 39.463, 39.465
See application file for complete search history.

(56) References Cited

U.S. PATENT DOCUMENTS

| 2,976,134 | A | * | 3/1961 | Paull ............................. 48/215 |
| 4,202,167 | A | * | 5/1980 | Suggitt et al. .................. 60/780 |
| 4,543,177 | A | * | 9/1985 | Murthy et al. ............... 208/130 |
| 6,298,651 | B1 | * | 10/2001 | Iijima ........................... 60/780 |
| 7,347,051 | B2 | * | 3/2008 | Christensen .................. 60/780 |
| 2002/0125173 | A1 | | 9/2002 | Kuno |
| 2007/0283701 | A1 | * | 12/2007 | Yokota et al. ................. 60/780 |

FOREIGN PATENT DOCUMENTS

| JP | 10-238369 A | 9/1998 |
| JP | 11-80750 A | 3/1999 |
| JP | 2002-317188 A | 10/2002 |
| JP | 2003-49180 | 2/2003 |

* cited by examiner

*Primary Examiner*—Michael Cuff
*Assistant Examiner*—Vikansha S Dwivedi
(74) *Attorney, Agent, or Firm*—Mattingly & Malur, P.C.

(57) ABSTRACT

A gas turbine system burning heavy-oil modified fuel and a method of operating the gas turbine system, which covers from a stage of modifying heavy oil and producing gas turbine fuel to a stage of operating a gas turbine, including startup, ordinary shutdown and emergency shutdown of the gas turbine. The gas turbine system burning heavy-oil modified fuel comprises a reactor for mixing heavy oil and water to cause reaction, thereby separating and removing a heavy component from the heavy oil, a gas-liquid separator for separating hydrocarbon gas and modified oil obtained in the reactor from each other, a gas turbine combustor for burning the hydrocarbon gas supplied from the gas-liquid separator, and a gas turbine driven by combustion gas produced in the gas turbine combustor. The system further comprises another line for extracting the hydrocarbon gas externally of a relevant system region. The other line is branched from a line for supplying the hydrocarbon gas from the gas-liquid separator to the gas turbine combustor.

8 Claims, 5 Drawing Sheets

GAS TURBINE SYSTEM BURNING HEAVY-OIL MODIFIED FUEL AND METHOD OF OPERATING SAME

BACKGROUND OF THE INVENTION

1. Field of the Invention

The present invention relates to a gas turbine system burning heavy-oil modified fuel and a method of operating the gas turbine system. More particularly, the present invention relates to a gas turbine system in which heavy oil is modified by reaction caused upon mixing with water and an obtained light component is burnt as fuel in a gas turbine for electric power generation, and to a method of operating the gas turbine system.

2. Description of the Related Art

Heavy oil contains considerable amounts of heavy metals and is not suitable as fuel for a gas turbine to generate electric power. Methods of removing metals from heavy oil for conversion to a useful energy source are therefore proposed so far. One of those methods includes the step of contacting high-temperature and high-pressure water with heavy oil under reaction conditions of not lower than 350° C. and not lower than 20 MPa, thereby decomposing the heavy oil (see, e.g., Patent Document 1; JP,A 2003-49180 (Abstract)). Hydrocarbon gas, a light oil component, a heavy component, and metal compounds, such as metal oxides, are obtained through decomposition of the heavy oil. Among them, the hydrocarbon gas and the light oil component are dissolved in the high-temperature and high-pressure water to obtain modified oil as gas turbine fuel. The metal compounds present in the heavy oil are removed in the form of calcium compounds or by combining them with a trapping agent, e.g., coke.

SUMMARY OF THE INVENTION

Hitherto, many reports have been made regarding methods of modifying heavy oil and gas-turbine power generation systems using modified oil as fuel while discussing them as separate issues. There are however few reports regarding a system including a heavy oil modifying line and a gas-turbine power generation line in a combined manner.

Controlling the heavy oil modifying line in link with the operation of a gas turbine is very important from the viewpoint of carrying out the modification of the heavy oil and the operation of the gas turbine with safety on a site.

An object of the present invention is to provide a combined system of a heavy oil modifying line and a gas turbine, in which the gas turbine can be safely operated, including startup, ordinary shutdown, and emergency shutdown.

To achieve the above object, the present invention provides a gas turbine system burning heavy-oil modified fuel, the system comprising a reactor for mixing heavy oil and water to cause reaction, thereby separating and removing a heavy component from the heavy oil; a gas-liquid separator for separating a light component obtained in the reactor into hydrocarbon gas and modified oil; a line for supplying the hydrocarbon gas separated by the gas-liquid separator to a gas turbine combustor; the gas turbine combustor for burning the hydrocarbon gas supplied through the line; a gas turbine driven by combustion gas produced in the gas turbine combustor; and another line for extracting the hydrocarbon gas separated by the gas-liquid separator externally of a relevant system region before the separated hydrocarbon gas is supplied to the gas turbine combustor.

In the present invention, the gas turbine system may further comprise a modified oil tank for storing the modified oil separated by the gas-liquid separator. The modified oil tank preferably has a capacity enough to store the modified oil in amount required for operating the gas turbine by using the modified oil stored in the modified oil, as fuel, during a period from startup of the reactor to a time when the hydrocarbon gas is produced in the gas-liquid separator.

The hydrocarbon gas extracted externally of the relevant system region before being supplied to the gas turbine combustor can be used to produce heating gas for heating the reactor.

The present invention also provides a method of operating a gas turbine system burning heavy-oil modified fuel, the method comprising the steps of mixing heavy oil and water in a reactor to cause reaction, thereby producing a heavy component and a light component; separating the light component per phase of gas and liquid into hydrocarbon gas and modified oil; and operating a gas turbine by using the separated hydrocarbon gas as fuel, wherein the method further comprises the steps of stopping supply of the hydrocarbon gas as fuel to the gas turbine at the time of stop of the operation of the gas turbine and extracting the hydrocarbon gas supplied from the reactor externally of a relevant system region.

In the method of operating the gas turbine system, the modified oil obtained by subjecting the light component to the gas-liquid separation may be stored and used as the gas turbine fuel at startup of the gas turbine during a period until the hydrocarbon gas is produced in the reactor and the gas-liquid separator.

Further, a process for stopping the operation of the reactor may be started after detecting a level of the modified oil in a tank at the time of stop of the operation of the gas turbine and confirming that the liquid level in the tank is enough to provide fuel in amount consumed by the gas turbine during the period until the hydrocarbon gas is produced in the reactor and the gas-liquid separator.

According to the present invention, in a system covering processes from modification of heavy oil to generation of electric power, i.e., in a system including stages of reacting heavy oil with high-temperature and high-pressure water to modify the heavy oil and using an obtained light component as main fuel for a gas turbine to generate electric power, it is possible to realize superior operability in startup, ordinary shutdown, emergency shutdown, etc. of the gas turbine.

DESCRIPTION OF THE PREFERRED EMBODIMENTS

An embodiment of the present invention will be described below with reference to the drawings. Note that the present invention is not limited to the following embodiment.

Embodiment

Figure 1:
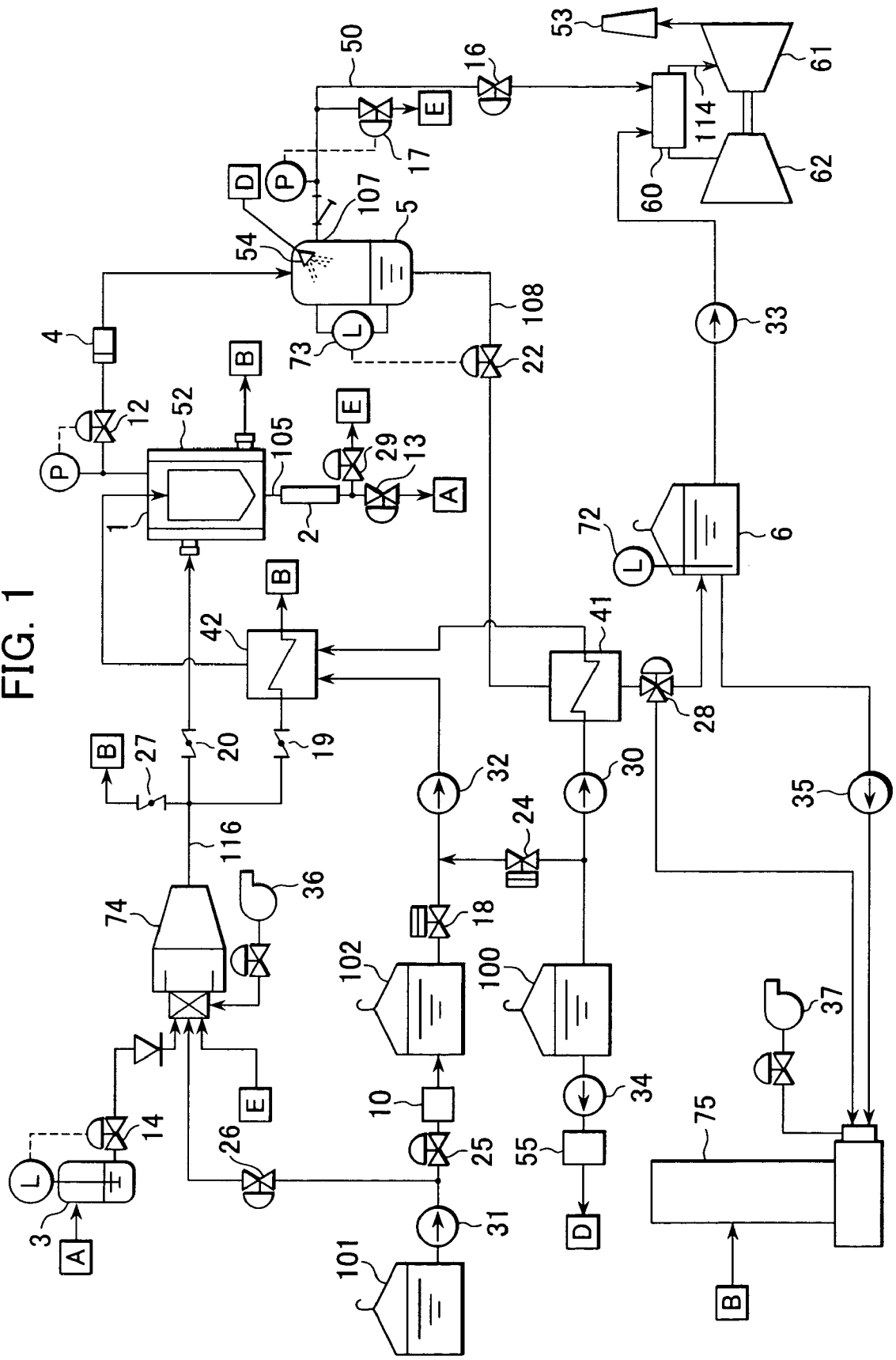
FIG. 1 is a diagram of a gas turbine system burning heavy-oil modified fuel according to one embodiment of the present invention.

In this embodiment, a system for mixing heavy oil with water to separate and remove heavy component from the heavy oil and supplying obtained heavy-oil modified fuel to a gas turbine for electric power generation will be described below with reference to FIG. 1.

In this embodiment, heavy oil stored in a heavy oil tank 101 is pressurized by a heavy oil supply pump 31 and is then divided into two lines. The heavy oil in one line is supplied to a heavy oil combustion furnace 74 in which the heavy oil is mixed with air supplied from a blower 36 associated with the heavy oil combustion furnace 74 and is burnt, to thereby produce heating gas 116. The heavy oil in the other line is supplied through a heavy oil supply valve 25 to a desalination apparatus 10 in which water-soluble impurities, such as sodium, potassium and chlorine, are removed, followed by being stored in a desalinated heavy-oil tank 102. The desalinated heavy oil in the desalinated heavy-oil tank 102 is pressurized to 10-25 MPa by a desalinated heavy-oil pressurizing pump 32.

Water stored in a water tank 100 is pressurized to 10-25 MPa by a water pressurizing pump 30 and is supplied to a water preheater 41. In the water preheater 41, the temperature of the pressurized water is raised through heat exchange with modified oil 108 that is obtained as a liquid component after gas-liquid separation performed in a gas-liquid separator 5. Because the temperature of the modified oil 108 varies in the range of room temperature to about 400° C., the temperature of the pressurized water at an outlet of the water preheater 41 is also changed depending on the temperature of the modified oil 108.

The water having the raised temperature and the desalinated heavy oil are mixed with each other into a fluid mixture that is sent to a mixing preheater 42 for heat exchange with the heating gas 116 generated in the heavy oil combustion furnace 74. The temperature of the fluid mixture at an outlet of the mixing preheater 42 is raised to 430-460° C. by adjusting the opening of a preheater gas-flow adjusting valve 19 and controlling the flow rate of the heating gas 116 supplied to the mixing preheater 42.

The fluid mixture preheated to 430-460° C. is supplied to a reactor 1. The reactor 1 is heated and held in a heated state by supplying the heating gas 116 generated in the heavy oil combustion furnace 74 to a heating furnace 52 surrounding the reactor 1. The inner temperature and pressure of the reactor 1 are set to 430-460° C. and 10-25 MPa, respectively, by adjusting the opening of a heating furnace gas-flow adjusting valve 20 and controlling the flow rate of the combustion gas supplied to the heating furnace 52. By setting an average residing time to 1.5-2.5 minutes in terms of density of steam under those temperature and pressure conditions, the heavy oil and the water in the fluid mixture react with each other to become a heavy component and a light component including steam. The light component is carried out of the reactor 1, and the heavy component is subjected to gravity separation in the reactor 1. Metals contained in the heavy oil are enriched in the heavy component and are extracted out of the reactor 1 by selectively opening and closing a reactor outlet valve 13 or an under-reactor valve 29 which are disposed in a heavy component extraction line 2. When the heavy component is extracted through the reactor outlet valve 13, a liquid level in a heavy component recovery tank 3 is measured. When the liquid level is high, the heavy component is extracted externally of the recovery tank 3 before supplying the extracted heavy component to the recovery tank 3 by opening a heavy component extraction valve 14 and closing the reactor outlet valve 13. The extracted heavy component is supplied as fuel to the heavy oil combustion furnace 74. On the other hand, when the heavy component is extracted through the under-reactor valve 29, the extracted heavy component is directly supplied to the heavy oil combustion furnace 74 to be mixed with air and burnt therein.

The pressure in the reactor 1 is adjusted by a depressurizing valve 12 and a depressurizer 4. To reduce pressure variations caused by variations in properties of the light component and the supply amounts of the water and the heavy oil, the opening of the depressurizing valve 12 is adjusted and an orifice is employed in the depressurizer 4 for depressurization. After having been depressurized to 2.5 MPa through the depressurizer 4, the light component is supplied to the gas-liquid separator 5 where it is separated into hydrocarbon gas 107 containing steam, hydrogen, carbon monoxide, carbon dioxide, hydrocarbon gases (hydrocarbons with the carbon number up to about 15), etc. and modified oil 108 as a liquefied component. The gas-liquid separator 5 has a water spray nozzle 54 through which water stored in the water tank 100 is supplied to the gas-liquid separator 5 after being pressurized by a spray water pump 34. The temperature in the gas-liquid separator 5 is adjusted by regulating the amount of spray water by a spray water regulator 55. The temperature in the gas-liquid separator 5 is preferably set to a value at which steam contained in the light component is not liquefied. More specifically, the temperature in the gas-liquid separator 5 is desired to be not lower than a value given by adding the boiling point of water under the pressure of 2.5 MPa in the gas-liquid separator 5, i.e., 224° C., and a temperature drop caused in a line downstream of the gas-liquid separator 5. If the temperature in the gas-liquid separator 5 is too high, the amount by which the modified oil 108 is evaporated is increased, and the amount of the modified oil 108 remaining as a liquid in the gas-liquid separator 5 is reduced. The modified oil 108 in the form of liquid fuel is used as fuel at the startup of the gas turbine. It is therefore required that the modified oil 108 be stored in a modified oil tank 6 in an amount sufficient for operating the gas turbine at least for a period from the startup of the gas turbine to a time when the modified oil 108 is produced and flows into the modified oil tank 6. Because a time of about 2-3 hours is taken to raise the inner temperature in the reactor 1 and the mixing preheater 42 to about 450° C., the capacity of the modified oil tank 6 is required to be triple or more the amount of fuel consumed per hour. Also, from the viewpoint of liquefying the hydrocarbon gas and increasing a production rate of the modified oil 108, the temperature in the gas-liquid separator 5 is preferably set to the lowest possible value within a controllable range at a level higher than the boiling point of water under the pressure in the gas-liquid separator 5. On the other hand, a further rise of the liquid level in the modified oil tank 6 is suppressed by increasing a production rate of the hydrocarbon gas. Accordingly, when a liquid level in the modified oil tank 6 is high during the ordinary operation, for example, the temperature in the gas-liquid separator 5 may be raised to reduce the amount of the modified oil 108 produced.

The pressure in the gas-liquid separator 5 is controlled to be held constant by using a gas-liquid-separator pressure adjusting valve 17. Between the gas-liquid separator 5 and a gas turbine combustor 60, a line 50 is disposed for supplying the hydrocarbon gas 107 separated by the gas-liquid separator 5 to the gas turbine combustor 60. The hydrocarbon gas 107 flowing through the line 50 is controlled in flow rate by a hydrocarbon gas flow control valve 16 and then supplied to the gas turbine combustor 60. In the gas turbine combustor 60, the supplied hydrocarbon gas 107 is mixed with air compressed by a compressor 62 and is burnt, thus producing combustion gas 114 that drives a gas turbine 61. Resulting combustion exhaust gas is released to the atmosphere through a stack 53.

A liquid level of the modified oil 108 in the gas-liquid separator 5 is measured by a gas-liquid-separator level gauge 73, and the opening of a liquid level adjusting valve 22 is adjusted so that the liquid level of the modified oil 108 is held constant. The modified oil 108 is extracted from the gas-liquid separator 5 through the liquid level adjusting valve 22 and is supplied to the water preheater 41. After being cooled in the water preheater 41 to 60° C. through heat exchange with water pressurized by the water pressurizing pump 30, the modified oil 108 is stored in the modified oil tank 6. Alternatively, by changing over a ground flare combustion valve 28 to the side communicating with a ground flare 75, the cooled modified oil 108 is supplied as fuel to the ground flare 75.

The modified oil 108 stored in the modified oil tank 6 is pressurized by a modified oil pump 33 and is supplied to the gas turbine combustor 60 while the flow rate of the modified oil 108 is controlled. Like the hydrocarbon gas 107, the modified oil 108 is mixed with air compressed by the compressor 62 and is burnt, thus producing the combustion gas 114 that drives the gas turbine 61. Resulting combustion exhaust gas is released to the atmosphere through the stack 53.

Figure 2:
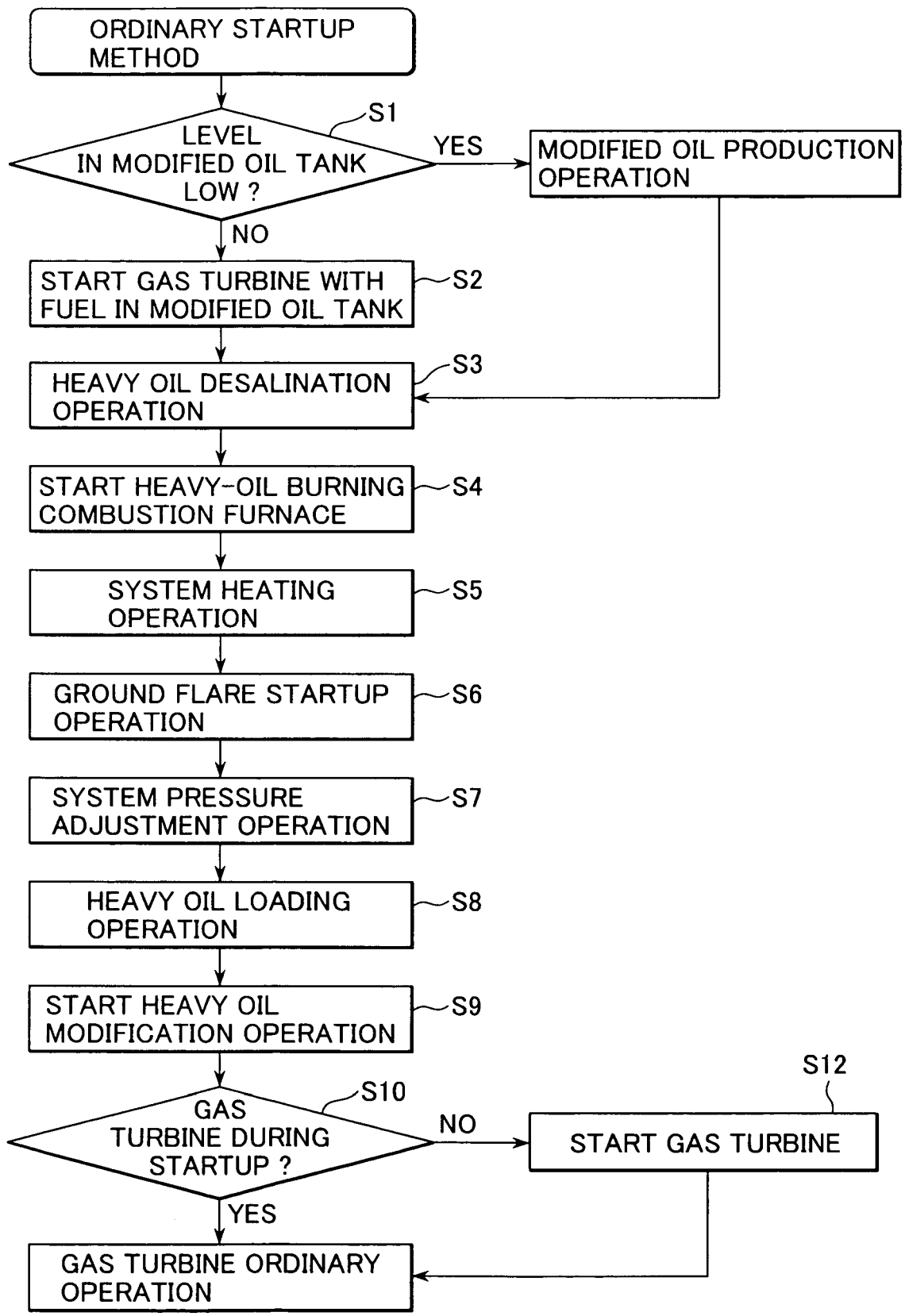
FIG. 2 is a flowchart showing a startup method.

FIG. 2 is a flowchart showing a startup method. The startup method for the gas turbine system burning the heavy-oil modified fuel will be described below with reference to FIG. 2 along with FIG. 1.

In the gas turbine system burning the heavy-oil modified fuel, a time of about 2-3 hours is taken to raise the temperature in the reactor 1 for modifying the heavy oil or the temperature in the mixing preheater 42 for heating the heavy oil and water to a predetermined value. If the time of about 2-3 hours is required to start the gas turbine, applications of this system are limited for users desiring output power to be quickly changed. In the present invention, to avoid such a disadvantage, the gas turbine system burning the heavy-oil modified fuel is started in accordance with the following steps.

In step S1, the liquid level of the modified oil 108 stored in the modified oil tank 6 is measured by a modified-oil-tank level gauge 72 to confirm that the modified oil tank 6 stores fuel in amount required by the gas turbine during a period from the startup of the system to the production of the modified oil 108. Because about 2-3 hours are taken to start the system including the heating of the reactor 1, etc., the amount of the modified oil 108 necessary for operating the gas turbine 61 for 3 hours or longer has to be stored in the modified oil tank 6. If the amount of the modified oil 108 necessary for operating the gas turbine 61 for 3 hours or longer is stored in the modified oil tank 6, the startup process advances to step S2, and if not so, it advances to step S3 to produce the modified oil 108 while skipping step S2.

In step S2, the modified oil 108 stored in the modified oil tank 6 is supplied as fuel to the gas turbine combustor 60 by the modified oil pump 33. The gas turbine 61 is thereby started to start generation of electric power in a similar manner to that in an ordinary gas turbine system burning liquid fuel.

In step S3, the heavy oil in the heavy oil tank 101 is supplied to the desalination apparatus 10 by the heavy oil supply pump 31 for removal of alkali metals such as sodium and potassium, alkali earth metals such as magnesium and calcium, and halogens such as chlorine and fluorine, which are mixed in the heavy oil. The desalinated heavy oil is stored in the desalinated heavy-oil tank 102. The amount of the desalinated heavy oil stored in the desalinated heavy-oil tank 102 is not specified to a particular value. If the processing capacity of the desalination apparatus 10 exceeds the amount of fuel consumed by the gas turbine per hour, the startup process can advance to step S4 at the same time when the desalinated heavy oil starts to be produced. As an alternative, it is also possible to advance the startup process to step S4 at the same time when the heavy oil supply pump 31 is started, by always storing the desalinated heavy oil in the desalinated heavy-oil tank 102 in such an amount as enabling the gas turbine to be operated for the time required to heat the reactor 1 to the predetermined temperature, i.e., for about 2-3 hours. Further, in the case of purchasing the heavy oil that is already desalinated, the desalination apparatus 10, the heavy oil tank 101, and the heavy oil supply pump 31 can be dispensed with, and it is just required to store the desalinated heavy oil in the desalinated heavy-oil tank 102.

In step S4, the heavy oil combustion furnace 74 is started to generate the heating gas 116 for heating the reactor 1 and the mixing preheater 42. The heavy oil extracted from the heavy oil tank 101 is pressurized by the heavy oil supply pump 31 and is supplied to the heavy oil combustion furnace 74 while the flow rate of the heavy oil is adjusted by a heavy-oil flow adjusting valve 26. In the heavy oil combustion furnace 74, the heavy oil is mixed with air supplied from the blower 36 associated with the heavy oil combustion furnace 74 and is burnt, to thereby produce the heating gas 116. The temperature of the heating gas 116 is adjusted to about 525° C. by controlling the amount of air supplied from the heavy-oil combustion furnace blower 36. From the viewpoint of shortening the startup time, it is preferable to raise the temperature of the heating gas 116 for increasing a temperature rising rate. However, a lower temperature is preferable in consideration of a corrosion rate causing a shortening of the life of the reactor 1 and the mixing preheater 42 and a rate of ash deposition causing a reduction of the heat transfer rate. In other words, if vanadium and sodium in the heavy oil form composite oxides, there is a possibility that those composite oxides are liquefied at temperatures near 525° C. and ash deposition progresses on external surfaces of heat transfer pipes of the mixing preheater 42 and an external surface of the reactor 1. For that reason, the temperature of the heating gas 116 is preferably not higher than 525° C.

In order to hold constant the pressure in the heavy oil combustion furnace 74, a pressure gauge is provided to measure the furnace pressure. The measured furnace pressure is taken into a pressure controller, and the opening of a valve 27 is adjusted in accordance with the pressure information so as to properly regulate the flow rate of the heating gas 116. As a result, the pressure in the heavy oil combustion furnace 74 can be held constant. The heating gas 116 discharged through the valve 27 is released to the atmosphere via the ground flare 75.

In step S5, the fluid temperatures in the mixing preheater 42 and the reactor 1 are raised to 430-460° C. by using the heating gas 116 produced by the heavy oil combustion furnace 74 of which operation has been started in step S4. The preheater gas-flow adjusting valve 19 is opened for supply of the heating gas 116 to the mixing preheater 42. At the same time or thereafter, the heating furnace gas-flow adjusting valve 20 is opened, whereupon the heating gas 116 is supplied to the heating furnace 52 for heating the reactor 1. If the temperature difference between the interiors of the mixing preheater 42 and the reactor 1 and the interior of the heating furnace 52 to be heated by the heating gas 116 is increased, there is a risk that stresses may be concentrated in welds, etc. to such an extent as causing cracks. In particular, a thick wall portion has a possibility that larger stress is generated therein. To avoid such a risk, substantially in match with the start of heating by the heating gas 116, the water stored in the water tank 100 is supplied to the mixing preheater 42 and the reactor 1 by opening a water supply valve 24 and operating the water pressurizing pump 30 and the desalinated heavy-oil pressurizing pump 32. The water heated by the mixing preheater 42 is supplied to the reactor 1, thus heating the reactor 1 from the interior, which also contributes to increasing the temperature rising rate of the reactor 1 that has a large heat capacity.

The openings of the preheater gas-flow adjusting valve 19 and the heating furnace gas-flow adjusting valve 20 may be fully opened. If temperature adjustment of the heating gas 116 is required, it is also possible to reduce the openings of the preheater gas-flow adjusting valve 19 and the heating furnace gas-flow adjusting valve 20. As in step S4, the opening of the valve 27 is similarly adjusted in step S5 so that the pressure in the heavy oil combustion furnace 74 is held constant.

The water supplied to the reactor 1 is extracted from the reactor 1 by opening the under-reactor valve 29 disposed under the reactor 1 and is sprayed to a heavy oil burning zone in the heavy oil combustion furnace 74, followed by becoming a part of the heating gas 116. After heating the mixing preheater 42 and the reactor 1, the water (steam) in the heating gas 116 is released to the atmosphere via the ground flare 75.

After confirming that the fluid temperatures in the mixing preheater 42 and the reactor 1 have reached near the critical temperature of water, the startup process advances to step S5 in which the temperature and pressure in the reactor 1 are adjusted respectively to 430-460° C. and 10-25 MPa, the gas-liquid separator 5 and the water preheater 41 are heated, and the temperature and pressure in the gas-liquid separator 5 are adjusted.

A thermometer is placed in the outlet of the mixing preheater 42 to measure the fluid temperature in that outlet. The fluid temperature in the outlet of the mixing preheater 42 is taken into a temperature controller, and the temperature controller adjusts the opening of the preheater gas-flow adjusting valve 19 to control the flow rate of the heating gas 116 so that the interior in the outlet of the mixing preheater 42 is held at a predetermined temperature.

Similarly to the temperature control for the mixing preheater 42, a thermometer is disposed inside the reactor 1 to measure the fluid temperature therein. The fluid temperature in the reactor 1 is taken into a temperature controller, and the temperature controller adjusts the opening of the heating furnace gas-flow adjusting valve 20 to control the flow rate of the heating gas 116 so that the interior of the reactor 1 is held at a predetermined temperature.

In step S6, before or at the same time as the startup of the water pressurizing pump 30 and the desalinated heavy-oil pressurizing pump 32 in step S5, a ground flare blower 37 and a ground flare pump 35 are started in operation to supply the modified oil 108 stored in the modified oil tank 6 to the ground flare 75 for burning therein. The level of the water having been condensed to a liquid in the gas-liquid separator 5 after passing through the mixing preheater 42 and the reactor 1 is measured by the gas-liquid-separator level gauge 73, and the liquid level in the gas-liquid separator 5 is held constant by adjusting the opening of the liquid level adjusting valve 22 with a liquid level controller. The water having passed through the liquid level adjusting valve 22 is supplied to the ground flare 75 via the ground flare combustion valve 28 (a three-way valve) shifted to a position communicating with the ground flare 75.

The water supplied to the ground flare 75 contains a small amount of oil. Therefore, the supplied water is mixed with the modified oil 108 and burnt in the ground flare 75 such that the small amount of oil contained in the water is also burnt.

Figure 3:
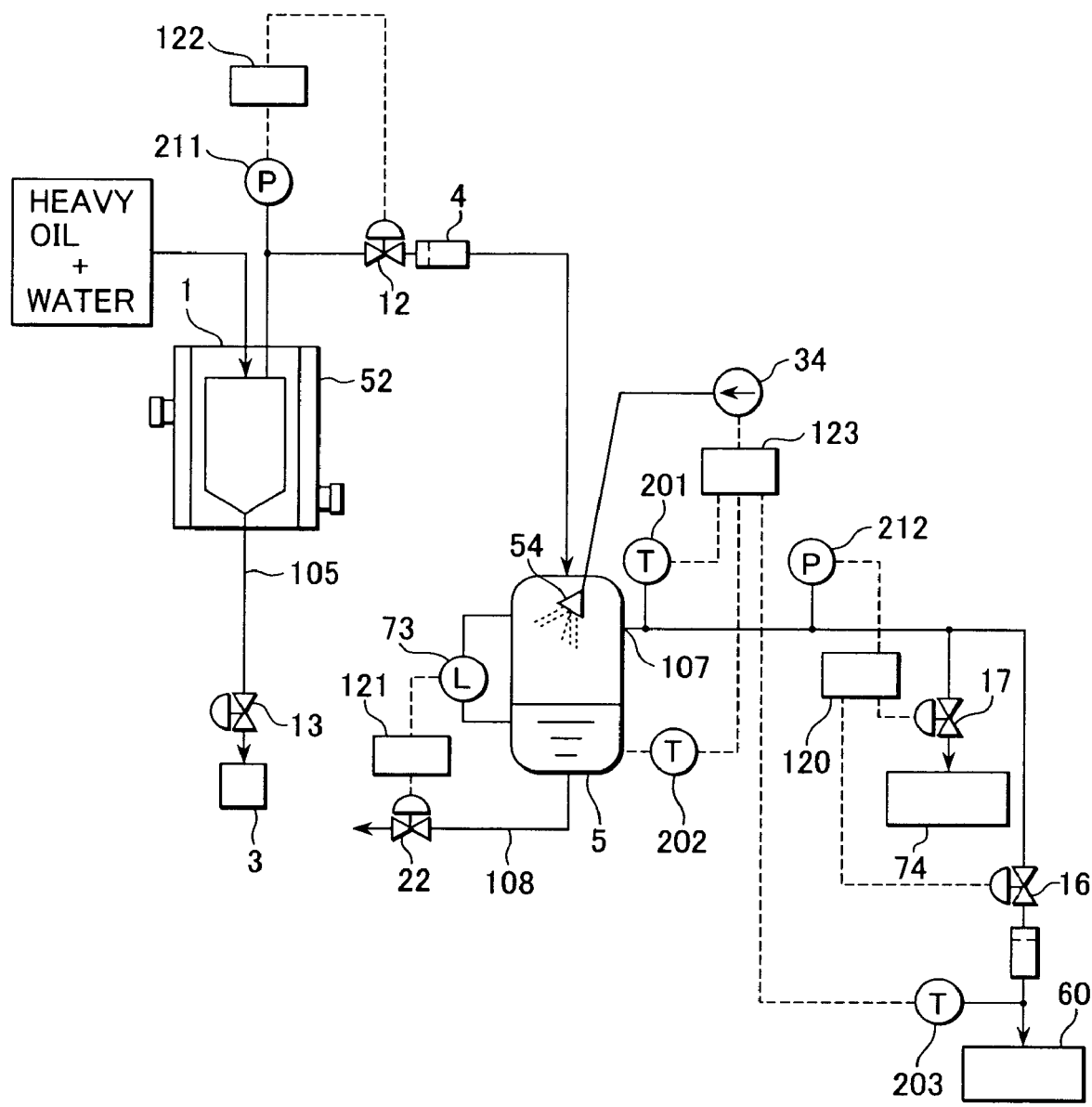
FIG. 3 is a diagram showing a control system for a reactor and a gas-liquid separator.

In step S7, the pressure in the gas-liquid separator 5 is adjusted to about 2.5 MPa and the pressure upstream of the reactor 1 is adjusted to 10-25 MPa by regulating the depressurizing vale 12. Thus, the pressures in the lines are adjusted to respective setting pressures. A method of controlling the various valves and devices in step S7 will be described below with reference to FIG. 3. FIG. 3 shows, in enlarged scale, the lines including the reactor 1, the gas-liquid separator 5, the gas turbine combustor 60, and the heavy oil combustion furnace 74, shown in FIG. 1, along with various controllers.

The fluid mixture of the high-temperature and high-pressure heavy oil and water is supplied to the reactor 1 in which the heavy component is separated for removal. The separated heavy component is recovered into the heavy component recovery tank 3 through the reactor outlet valve 13. On the other hand, the light component is depressurized through the depressurizing valve 12 and the depressurizer 4 and is then supplied to the gas-liquid separator 5. In the gas-liquid separator 5, the light component is separated into a liquid and gas. The level of the separated liquid component is measured by the gas-liquid-separator level gauge 73, and the measured value is taken into a liquid level controller 121, and the liquid level is controlled to be held constant by the liquid level adjusting valve 22. The modified oil having passed through the liquid level adjusting valve 22 is supplied to the modified oil tank 6. The separated gas component is supplied to the heavy oil combustion furnace 74 through the gas-liquid-separator pressure adjusting valve 17 or supplied to the gas turbine combustor 60 through the hydrocarbon gas flow control valve 16.

When the gas turbine 61 is not yet started, the hydrocarbon gas 107 supplied to the gas turbine is directly leaked to the exterior. In that state, therefore, the hydrocarbon gas flow control valve 16 is not opened to block passage of the steam and the hydrocarbon gas 107 through it.

Variations of the pressure and temperature change the states of the reactor 1 and the gas-liquid separator 5, thus changing not only a removal rate of vanadium from the heavy oil and a gas-liquid separation ratio of the modified oil, but also the compositions of the modified oil 108 and the hydrocarbon gas 107. From the limitation in response speed of the pump and controller, it is impossible to control an abrupt change of the fuel composition by changing the flow rate of the modified oil supplied by the modified oil pump 33. Stated another way, the abrupt change of the fuel composition may impair combustion stability of the gas turbine combustor 60 and may extinguish fire, thus making unstable the operation of the gas turbine 61 to generate electric power. A method of properly controlling the temperatures and pressures in the reactor 1 and the gas-liquid separator 5 will be described below.

In order to adjust the pressure upstream of the reactor 1 to the setting value (10-25 MPa), a pressure gauge 211 is disposed at the outlet of the reactor 1, and the measured value is taken into a reactor pressure controller 122. Then, the reactor pressure controller 122 outputs, to the depressurizing valve 12, a command for adjusting its opening so as to hold the pressure upstream of the reactor 1 at the setting value. As a result, the pressure upstream of the reactor 1 can be held constant at the setting value.

Also, in order to adjust the pressure in the gas-liquid separator 5 to the setting value (about 2.5 MPa), a pressure gauge 212 is disposed at the outlet of the gas-liquid separator 5, and the measured value is taken into a gas-liquid-separator pressure controller 120. Then, the gas-liquid separator pressure controller 120 outputs, to the gas-liquid-separator pressure adjusting valve 17, a command for adjusting its opening so as to hold the pressure in the gas-liquid separator 5 at the setting value. As a result, the pressure in the gas-liquid separator 5 can be held constant at the setting value. Further, when the gas turbine 61 is already started, the hydrocarbon gas flow control valve 16 is opened to allow the hydrocarbon gas 107 containing the steam to flow into the gas turbine combustor 60 in which the hydrocarbon gas 107 is burnt. Higher efficiency is obtained in the generation of electric power by burning the hydrocarbon gas 107 in the gas turbine combustor 60 to drive the gas turbine 61 as compared with the case of burning the same in the heavy oil combustion furnace 74. Therefore, the gas-liquid separator pressure controller 120 controls the hydrocarbon gas flow control valve 16 so that the flow rate of the hydrocarbon gas 107 passing through the gas-liquid-separator pressure adjusting valve 17 is minimized and the flow rate of the hydrocarbon gas 107 supplied to the gas turbine combustor 60 is maximized. In other words, the opening of the gas-liquid-separator pressure adjusting valve 17 is set to zero, and the opening of the hydrocarbon gas flow control valve 16 is decided by the gas-liquid-separator pressure controller 120 such that the measured value of the pressure gauge 212 is held at the setting pressure.

In order to hold the gas-liquid separation ratio constant and to stabilize the fuel properties, the temperature in the gas-liquid separator 5 is held at constant. In this embodiment, the spray water pump 34 is actuated to spray water through the water spray nozzle 54 so as to hold the temperature in the gas-liquid separator 5 at constant. The liquid temperature in the gas-liquid separator 5 is measured by a thermometer 202, and the measured temperature value is taken into a gas-liquid-separator temperature controller 123. The flow rate of the water supplied from the spray water pump 34 is controlled in accordance with a command from the gas-liquid-separator temperature controller 123 so that the internal liquid temperature is not lower than the boiling point of water under the pressure in the gas-liquid separator 5, thereby adjusting the amount of the spray water. Further, one or both of the temperatures measured by thermometers 201 and 203 are taken into the gas-liquid-separator temperature controller 123. When there is a possibility that moisture contained in the hydrocarbon gas is condensed at the inlet of the gas turbine combustor 60, the gas-liquid-separator temperature controller 123 outputs a command for reducing the amount of the water sprayed from the water spray pump 34.

If the temperatures and pressures in the reactor 1 and the gas-liquid separator 5 are increased to and stabilized at the setting temperatures and the setting pressures in step S7, the startup process advances to step S8. In step S8, the water supply valve 24 is closed, a desalinated heavy-oil supply valve 18 is opened, and the heavy oil is supplied by operating the desalinated heavy-oil pressurizing pump 32. When the heavy oil passes through the mixing preheater 42 and the reactor 1, the temperature in the outlet of the mixing preheater 42 and the temperature in the outlet of the reactor 1 are changed due to the difference in specific heat between the heavy oil and water. Responsively, the openings of the preheater gas-flow adjusting valve 19 and the heating furnace gas-flow adjusting valve 20 are adjusted so that the internal temperatures are adjusted to fall in the predetermined range of 430 to 460° C.

After confirming that the internal temperatures have become steady, the under-reactor valve 29 is closed and the opening of the reactor outlet valve 13 is increased, thus causing the heavy component 105 to be extracted through the heavy component extraction line 2 and recovered into the heavy component recovery tank 3. The liquid level in the heavy component recovery tank 3 is controlled such that 0.5-10 wt % of the desalinated heavy oil having been supplied by the desalinated heavy-oil pressurizing pump 32 is extracted as the heavy component 105. By opening the heavy component extraction valve 14, the heavy component 105 is supplied to the heavy oil combustion furnace 74 in which it is mixed with air supplied from the heavy-oil combustion furnace blower 36 and is burnt.

In step S9, after confirming that the mixing preheater outlet temperature, the reactor outlet temperature, and the liquid temperature and the gas temperature in the gas-liquid separator have been stabilized, a flow of the modified oil 108 having been supplied to the ground flare 75 through the heat exchange in the water preheater 41 is changed to direct toward the modified oil tank 6 by operating the ground flare combustion valve 28. For the ground flare 75 for which the supply of the modified oil 108 after being subjected to the heat exchange is stopped, the supply of the modified oil 108 stored in the modified oil tank 6 and the operation of the ground flare blower 37 are also stopped. After confirming that the liquid level in the modified oil tank 6 supplied with the modified oil 108 has elevated, the startup process advances to step S10.

In step S10, when the gas turbine 61 is already started, the operation mode shifts to the ordinary operation at once. When the gas turbine 61 is not yet started, the gas turbine 61 is started using the modified oil 108 stored in the modified oil tank 6, followed by shifting to the ordinary operation. After coming into the ordinary operation, supply of the hydrocarbon gas 107 to the gas turbine combustor 60 is started and all the amount of the hydrocarbon gas 107 is supplied to the gas turbine combustor 60. The gas turbine system burning the heavy-oil modified fuel is started through the above-described steps.

Figure 4:
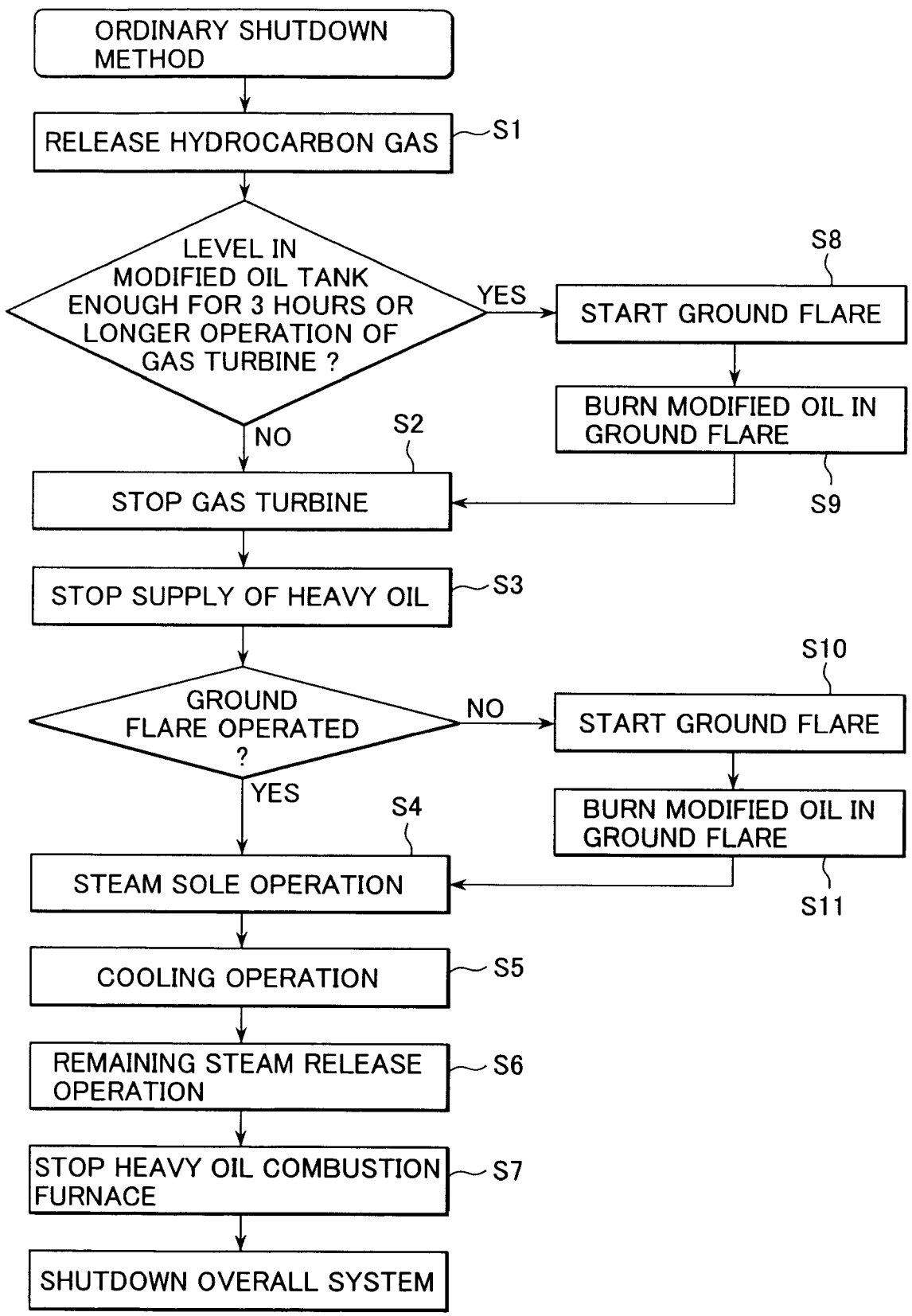
FIG. 4 is a flowchart showing an ordinary shutdown method.

An ordinary shutdown method for the gas turbine system burning the heavy-oil modified fuel will be described below. Because the hydrocarbon gas is generated by thermal decomposition of the heavy oil in this system, the generated hydrocarbon gas has to be released from the gas turbine combustor 60 to another place when the gas turbine 61 is stopped. Also, if the heavy oil is left remaining in the mixing preheater 42 and the reactor 1 at high temperatures, there is a possibility that the heavy oil may cause coking and clogging may occur in pipes, etc. in the system. Therefore, the system has to be completely shut down after purging the heavy oil. To that end, the gas turbine system burning the heavy-oil modified fuel is shut down in the ordinary case in accordance with a flowchart shown in FIG. 4.

In step S1, the hydrocarbon gas flow control valve 16 is closed and the opening of the gas-liquid-separator pressure adjusting valve 17 is adjusted so that the pressure in the gas-liquid separator 5 is about 2.5 MPa, thereby releasing the hydrocarbon gas 107 to the heavy oil combustion furnace 74. The gas turbine 61 is thus brought into the state where only the modified oil 108 is burnt.

If the modified oil 108 remains in the modified oil tank 6 in amount capable of operating the gas turbine for 3 hours or longer, this means that the gas turbine can be immediately started at the next startup of the system. By measuring the liquid level in the modified oil tank 6, it is confirmed whether the modified oil 108 remains in amount capable of operating the gas turbine for 3 hours or longer. If remains, the shutdown process advances to step S8 in which the ground flare 75 is started, and if not so, it advances to step S2 to start the operation for stopping the gas turbine.

In step S8, the modified oil 108 stored in the modified oil tank 6 is supplied to the ground flare 75 by the ground flare pump 35, in which the modified oil 108 is mixed with air supplied from the ground flare blower 37 and is burnt.

In step S9, the ground flare combustion valve 28 is operated to allow the modified oil 108 to flow toward the ground flare 75, whereby the modified oil 108 supplied from the gas-liquid separator 5 through the water preheater 41 is introduced to the ground flare 75 and is burnt therein.

After step S1 or step S9, the operation of stopping the gas turbine 61 is commenced in step 2. First, the supply of the modified oil 108 stored in the modified oil tank 6 to the gas turbine combustor 60 is stopped in the ordinary shutdown process. At the same time, the modified oil pump 33 is stopped.

In step S3, the liquid level in the modified oil tank 6 is checked again to confirm that the modified oil 108 remains in amount capable of operating the gas turbine for 3 hours or longer. If confirmed, the water supply valve 24 is opened and the desalinated heavy-oil supply valve 18 is closed to stop the supply of the heavy oil, thereby purging the heavy oil, the heavy component 105, and the modified oil 108 which are remained in the lines including the mixing preheater 42, the reactor 1, the gas-liquid separator 5, and so on. At the same time, the desalination apparatus 10 is stopped to stop the production of the desalinated heavy oil.

If the ground flare 75 has not been started in step S8, the ground flare 75 is started in steps S10 and S11 in the same manner as that in steps S8 and S9. If the ground flare 75 has already been started, the shutdown process advances to step S4.

In step S4, the heavy oil, the heavy component 105, and the modified oil 108 remaining in the lines including the mixing preheater 42, the reactor 1, the gas-liquid separator 5, etc. are purged by operating the desalinated heavy-oil pressurizing pump 32 and the water pressurizing pump 30. To purge the oil components remaining in the lines, the reactor outlet valve 13 is closed and simultaneously the opening of the under-reactor valve 29 is set to such an extent as not lowering the pressure in the reactor 1, whereby the heavy component 105 is supplied to the heavy oil combustion furnace 74 and is burnt therein.

By monitoring the combustion temperature of the ground flare 75, it is confirmed that the modified oil 108 has been replaced with water. Similarly, by monitoring the combustion temperature of the heavy oil combustion furnace 74, it is confirmed that the heavy component 105 and the hydrocarbon gas 107 have been replaced with water. The steam sole operation in step S4 is continued until the above two points are confirmed.

After the end of step S4, the operation of cooling the entire system is started in step S5. The depressurizing valve 12 is closed to stop the flow toward the line downstream of the gas-liquid separator 5 for cooling it. Also, the preheater gas-flow adjusting valve 19 and the heating furnace gas-flow adjusting valve 20 are closed and the heating gas 116 is released through the valve 27, thus stopping the supply of the heating gas 116 produced by the heavy oil combustion furnace 74 to the mixing preheater 42 and the reactor 1.

In step S6, the steam remaining in the lines and containing a small amount of the oil components mixed therein is released for depressurization. The steam cannot be directly released to the atmosphere because of containing the small amount of the oil components. Therefore, the under-reactor valve 29 is opened, whereby the steam flows into the heavy oil combustion furnace 74 and the pressure in the reactor 1 is dropped to a level about twice that in the heavy oil combustion furnace 74. After confirming the drop of the pressure in the reactor 1, the supply of the heavy oil to the heavy oil combustion furnace 74 is stopped in step S7 and the heavy-oil combustion furnace blower 36 is also stopped. As a result, the heavy oil combustion furnace 74 is stopped and all the lines are completely shut down. The ordinary shutdown of the system can be performed through the above-described steps.

Figure 5:
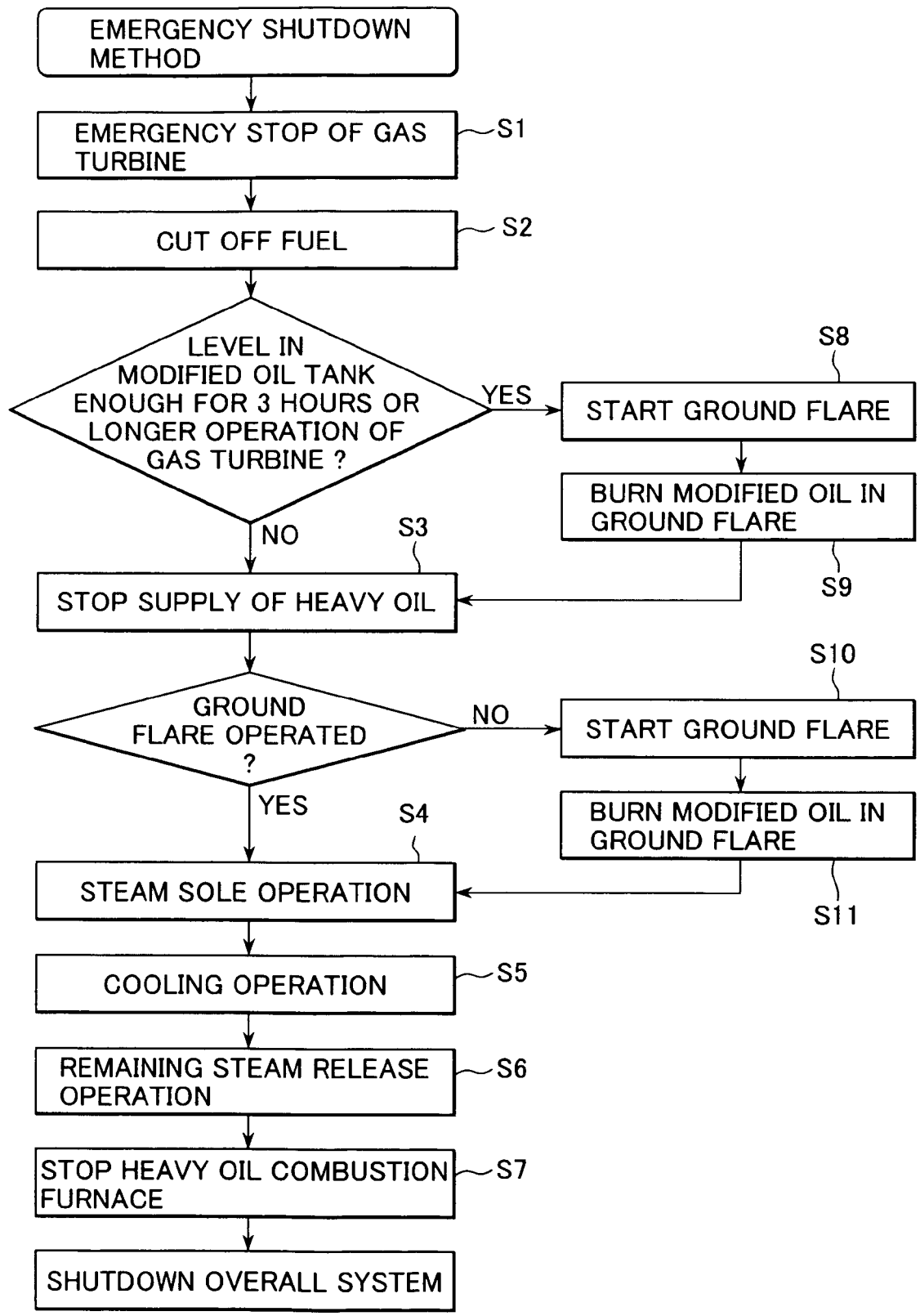
FIG. 5 is a flowchart showing an emergency shutdown method.

An emergency shutdown method for the gas turbine system burning the heavy-oil modified fuel will be described below. Because the hydrocarbon gas is generated by thermal decomposition of the heavy oil in this system, the generated hydrocarbon gas has to be released from the gas turbine combustor 60 to another place at the same time as when the gas turbine 61 is stopped. Also, as in the ordinary shutdown, if the heavy oil is left remaining in the mixing preheater 42 and the reactor 1 at high temperatures, there is a possibility that the heavy oil may cause coking and clogging may occur in pipes, etc. in the system. Therefore, the system has to be completely shut down after purging the heavy oil. To that end, the gas turbine system burning the heavy-oil modified fuel is shut down in the emergence case in accordance with a flowchart shown in FIG. 5.

In the emergency shutdown, the gas turbine 61 is emergently stopped in step S1. In step S2, the hydrocarbon gas flow control valve 16 is closed to emergently cut off the fuel, and the modified oil pump 33 is stopped to stop the supply of the modified oil 108 from the modified oil tank 6. At that time, the opening of the gas-liquid-separator pressure adjusting valve 17 is adjusted so as to emergently release the hydrocarbon gas 107 to the heavy oil combustion furnace 74.

After step S2, the emergency shutdown process is executed through the same steps as those in the ordinary shutdown process, whereby the system can be safely shut down.

According to this embodiment, in the gas turbine system burning heavy oil as fuel, it is possible to eliminate restrictions imposed on the operation of the gas turbine, which are caused by a time delay until the modified oil is produced in the heavy oil modifying line and a time delay until the heavy oil is purged, and to perform the startup and shutdown of the system in a smooth and quick manner. Further, the system can be safely shut down in both the cases of the ordinary shutdown and the emergency shutdown.

Thus, since the system including the heavy oil modifying line and the gas-turbine electric power generating line can be safely operated including the startup, the ordinary shutdown and the emergency shutdown, the present invention is applicable to a wide range of fields with very valuable advantages.

What is claimed is:

1. A gas turbine system burning heavy-oil modified fuel, said system comprising:
    a reactor for mixing heavy oil and water to cause reaction, thereby separating and removing a heavy component from the heavy oil;
    a gas-liquid separator for separating a light component obtained in said reactor into hydrocarbon gas and modified oil;
    a line for supplying the hydrocarbon gas separated by said gas-liquid separator to a gas turbine combustor;
    said gas turbine combustor for burning the hydrocarbon gas supplied through said line; and
    a gas turbine driven by combustion gas produced in said gas turbine combustor,
    wherein said system further comprises another line for extracting the hydrocarbon gas externally of a relevant system region, the other line being branched from an intermediate point of said line for supplying the hydrocarbon gas separated by said gas-liquid separator to said gas turbine combustor.

2. The gas turbine system burning the heavy-oil modified fuel according to claim 1, further comprising a combustion furnace for burning the hydrocarbon gas extracted externally of the relevant system region.

3. The gas turbine system burning the heavy-oil modified fuel according to claim 2, wherein combustion gas produced in said combustion furnace is supplied as heating gas for said reactor.

4. The gas turbine system burning the heavy-oil modified fuel according to claim 2, further comprising a line for supplying the heavy component separated by said reactor to said combustion furnace.

5. The gas turbine system burning the heavy-oil modified fuel according to claim 1, further comprising a modified oil tank for storing the modified oil separated by said gas-liquid separator, wherein said gas turbine is operated by using, as fuel, the modified oil stored in said modified oil tank during a period from startup of said reactor to a time when the hydrocarbon gas is obtained in said gas-liquid separator.

6. The gas turbine system burning the heavy-oil modified fuel according to claim 5, wherein said modified oil tank has a capacity enough to store the modified oil in amount consumed by said gas turbine during the period from the startup of said reactor to the time when the hydrocarbon gas is obtained in said gas-liquid separator.

7. A gas turbine system burning heavy-oil modified fuel, said system comprising:
   a reactor for mixing heavy oil and water to cause reaction, thereby separating and removing a heavy component from the heavy oil;
   a gas-liquid separator for separating a light component obtained in said reactor into hydrocarbon gas and modified oil;
   a line for supplying the hydrocarbon gas separated by said gas-liquid separator to a gas turbine combustor;
   said gas turbine combustor for burning the hydrocarbon gas supplied through said line; and
   a gas turbine driven by combustion gas produced in said gas turbine combustor,
   wherein said system further comprises:
   another line for extracting the hydrocarbon gas externally of a relevant system region, the other line being branched from an intermediate point of said line for supplying the hydrocarbon gas separated by said gas-liquid separator to said gas turbine combustor; and
   a modified oil tank for storing the modified oil separated by said gas-liquid separator, the modified oil stored in said modified oil tank being used as gas turbine fuel at startup of said gas turbine during a period until the light component is produced in said reactor.

8. The gas turbine system burning the heavy-oil modified fuel according to claim 7, further comprising a heavy oil combustion furnace for producing heating gas for said reactor by using, as a part of fuel, the hydrocarbon gas extracted externally of the relevant system region.

* * * * *